(12) United States Patent
Hoess et al.

(10) Patent No.: US 9,067,389 B2
(45) Date of Patent: Jun. 30, 2015

(54) TRANSPARENT PLASTIC COMPOSITE

(75) Inventors: Werner Hoess, Shanghai (CN); Michael Zietek, Ober-Ramstadt (DE); Michael Enders, Dieburg (DE); Christian Eberle, Griesheim (DE); Sven Schroebel, Darmstadt (DE); Klaus Albrecht, Mainz (DE); Rudolf Blass, Darmstadt (DE); Klaus Schultes, Wiesbaden (DE); Arne Schmidt, Darmstadt (DE)

(73) Assignee: Evonik Roehm GmbH, Darmstadt (DE)

( * ) Notice: Subject to any disclaimer, the term of this patent is extended or adjusted under 35 U.S.C. 154(b) by 844 days.

(21) Appl. No.: 12/300,408

(22) PCT Filed: Mar. 14, 2007

(86) PCT No.: PCT/EP2007/052391
§ 371 (c)(1),
(2), (4) Date: Nov. 11, 2008

(87) PCT Pub. No.: WO2008/000528
PCT Pub. Date: Jan. 3, 2008

(65) Prior Publication Data
US 2009/0226730 A1    Sep. 10, 2009

(30) Foreign Application Priority Data
Jun. 26, 2006  (DE) .................. 10 2006 029 613

(51) Int. Cl.
*B32B 27/18* (2006.01)
*B32B 27/40* (2006.01)
*B32B 27/30* (2006.01)

(52) U.S. Cl.
CPC .............. *B32B 27/18* (2013.01); *B32B 27/308* (2013.01); *B32B 27/30* (2013.01); *B32B 27/40* (2013.01)

(58) Field of Classification Search
CPC ...... B32B 27/18; B32B 27/30; B32B 27/308; B32B 27/40
USPC ........................................ 524/507
See application file for complete search history.

(56) References Cited

U.S. PATENT DOCUMENTS

| | | | |
|---|---|---|---|
| 3,872,804 A * | 3/1975 | Yarnall | 109/49.5 |
| 4,046,933 A | 9/1977 | Stefanik | |
| 4,177,099 A | 12/1979 | Radzwill | |
| 4,594,290 A * | 6/1986 | Fischer et al. | 428/212 |
| 4,833,221 A | 5/1989 | Albrecht | |
| 5,110,877 A | 5/1992 | Hoess et al. | |
| 5,155,172 A | 10/1992 | Siol et al. | |

(Continued)

FOREIGN PATENT DOCUMENTS

| | | |
|---|---|---|
| CA | 2 413 391 A1 | 6/2003 |
| EP | 0 239 877 | 10/1987 |

(Continued)

OTHER PUBLICATIONS

U.S. Appl. No. 12/922,627, filed Sep. 14, 2010, Khrenov, et al.

(Continued)

*Primary Examiner* — Angela C Scott
(74) *Attorney, Agent, or Firm* — Oblon, McClelland, Maier & Neustadt, L.L.P.

(57) ABSTRACT

The invention describes a transparent plastics composite composed of PMMA and TPU with excellent mechanical properties.

15 Claims, 1 Drawing Sheet

Key:

PMMA (1)
PMMA (2)
TPU (3)

(56) References Cited

U.S. PATENT DOCUMENTS

| | | |
|---|---|---|
| 5,219,931 A | 6/1993 | Siol et al. |
| 5,229,204 A | 7/1993 | Labock |
| 5,270,397 A | 12/1993 | Rhein et al. |
| 5,277,944 A * | 1/1994 | Holzer et al. ............... 428/412 |
| 5,280,073 A | 1/1994 | Siol et al. |
| 5,372,771 A | 12/1994 | Labock |
| 5,530,080 A | 6/1996 | Siol et al. |
| 5,548,033 A | 8/1996 | Vetter et al. |
| 5,612,417 A | 3/1997 | Rhein et al. |
| 5,652,316 A | 7/1997 | May et al. |
| 5,705,189 A | 1/1998 | Lehmann et al. |
| 5,726,245 A | 3/1998 | Numrich et al. |
| 5,747,159 A | 5/1998 | Labock |
| 6,040,387 A | 3/2000 | Albrecht et al. |
| 6,132,882 A | 10/2000 | Landin et al. |
| 6,214,942 B1 | 4/2001 | Siol et al. |
| 6,287,470 B1 | 9/2001 | Vetter et al. |
| 6,355,712 B1 | 3/2002 | Schultes et al. |
| 6,576,255 B1 | 6/2003 | Petereit et al. |
| 6,613,871 B2 | 9/2003 | Hoess et al. |
| 6,765,046 B1 | 7/2004 | Numrich et al. |
| 6,803,416 B2 | 10/2004 | Schultes et al. |
| 6,809,163 B2 | 10/2004 | Schultes et al. |
| 6,890,993 B2 | 5/2005 | Schultes et al. |
| 6,998,140 B2 | 2/2006 | Meier et al. |
| 7,179,852 B2 | 2/2007 | Schultes et al. |
| 7,339,732 B2 * | 3/2008 | Parusel et al. ............... 359/453 |
| 7,371,795 B2 | 5/2008 | Wicker et al. |
| 7,381,552 B2 | 6/2008 | Menzler et al. |
| 7,498,373 B2 | 3/2009 | Schmitt et al. |
| 2002/0160042 A1 | 10/2002 | Petereit et al. |
| 2003/0031850 A1 * | 2/2003 | Scharnke et al. ............... 428/221 |
| 2004/0104501 A1 | 6/2004 | Petereit et al. |
| 2004/0258924 A1 * | 12/2004 | Berger et al. ............... 428/423.1 |
| 2005/0080188 A1 | 4/2005 | Schultes et al. |
| 2005/0152977 A1 | 7/2005 | Petereit et al. |
| 2005/0170189 A1 * | 8/2005 | Haas et al. ............... 428/423.1 |
| 2005/0267250 A1 | 12/2005 | Theil et al. |
| 2006/0052515 A1 | 3/2006 | Schultes et al. |
| 2006/0121248 A1 | 6/2006 | Lorenz et al. |
| 2006/0147714 A1 | 7/2006 | Schultes et al. |
| 2006/0175735 A1 | 8/2006 | Hoess et al. |
| 2006/0281887 A1 | 12/2006 | Petereit et al. |
| 2007/0055017 A1 | 3/2007 | Schultes et al. |
| 2007/0066708 A1 | 3/2007 | Goldacker et al. |
| 2007/0122624 A1 | 5/2007 | Schultes et al. |
| 2007/0123610 A1 | 5/2007 | Schultes et al. |
| 2007/0197703 A1 | 8/2007 | Neuhauser et al. |
| 2007/0222117 A1 | 9/2007 | Hoess et al. |
| 2007/0276093 A1 | 11/2007 | Schultes et al. |
| 2008/0132627 A1 | 6/2008 | Schultes et al. |
| 2008/0161469 A1 | 7/2008 | Hoss et al. |
| 2008/0188616 A1 | 8/2008 | Scharz-Barac et al. |
| 2008/0242782 A1 | 10/2008 | Hager et al. |
| 2008/0248298 A1 | 10/2008 | Numrich et al. |
| 2008/0281023 A1 | 11/2008 | Numrich et al. |
| 2010/0098907 A1 | 4/2010 | Schultes et al. |
| 2010/0098908 A1 | 4/2010 | Schultes et al. |
| 2010/0148401 A1 | 6/2010 | Schultes et al. |
| 2010/0167045 A1 | 7/2010 | Schultes et al. |
| 2010/0174022 A1 | 7/2010 | Schultes et al. |
| 2010/0189983 A1 | 7/2010 | Numrich et al. |
| 2011/0009539 A1 | 1/2011 | Goldacker et al. |
| 2011/0230610 A1 | 9/2011 | Schultes et al. |
| 2012/0282396 A1 | 11/2012 | Schultes et al. |

FOREIGN PATENT DOCUMENTS

| | | | |
|---|---|---|---|
| EP | 1 577 084 | 9/2005 | |
| JP | 58-147356 | 9/1983 | |
| JP | 60-8059 B2 | 2/1985 | |
| JP | 62-278035 | 12/1987 | |
| JP | 63-005942 | 1/1988 | |
| JP | 3-6931 | 1/1991 | |
| JP | 7-117176 | 5/1995 | |
| KR | 10-2000-0057580 | 9/2000 | |
| WO | WO 01/77723 A1 | 10/2001 | |
| WO | WO 02/47908 | 6/2002 | |
| WO | WO 2005022253 A1 * | 3/2005 | ............. G03B 21/62 |

OTHER PUBLICATIONS

U.S. Appl. No. 11/748,874, filed May 15, 2007, Schultes, et al.
U.S. Appl. No. 11/970,190, filed Jan. 7, 2008, Schultes, et al.
U.S. Appl. No. 12/094,277, filed May 20, 2008, Schultes, et al.
U.S. Appl. No. 60/831,222, filed Jul. 17, 2006, Hager, et al.
U.S. Appl. No. 12/738,033, filed Apr. 14, 2010, Schultes, et al.
U.S. Appl. No. 12/682,405, filed Apr. 9, 2010, Schmidt, et al.
U.S. Appl. No. 11/720,653, filed Jun. 1, 2007, Schultes, et al.
U.S. Appl. No. 12/436,809, filed May 7, 2009, Schultes, et al.
U.S. Appl. No. 13/123,544, filed Apr. 11, 2011, Battenhausen, et al.
U.S. Appl. No. 13/123,790, filed Apr. 12, 2011, Battenhausen, et al.
U.S. Appl. No. 13/375,843, filed Dec. 2, 2011, Schmidt, et al.
U.S. Appl. No. 13/241,776, filed Sep. 23, 2011, Hoess, et al.
Canadian Office Action Issued Nov. 13, 2012 in Patent Application No. 2,655,063.
U.S. Appl. No. 13/636,370, filed Sep. 21, 2012, Clamer, et al.
Vieveg, et al. "Kunststoff-Handbuch, Band IX, Polymethacrylate" (Chapter 3.1.1.4), Carl Hanser Verlag Munchen, 1975.
Notice of Preliminary Rejection from the Korean Intellectual Property Office (KIPO) in Korean Patent Application No. 10-2008-7031460 dated Jul. 15, 2013 (with English-language Translation).
Canadian Office Action issued Oct. 21, 2013 in Patent Application No. 2,655,063.
Office Action issued Mar. 25, 2014 in Korean Patent Application No. 10-2014-7005356.
Canadian Examiner's Requisition issued Aug. 22, 2014 in Canadian Patent Application No. 2,655,063.
Examiner's Requisition issued Mar. 6, 2015, in corresponding Canadian Application No. 2,655,063.

* cited by examiner

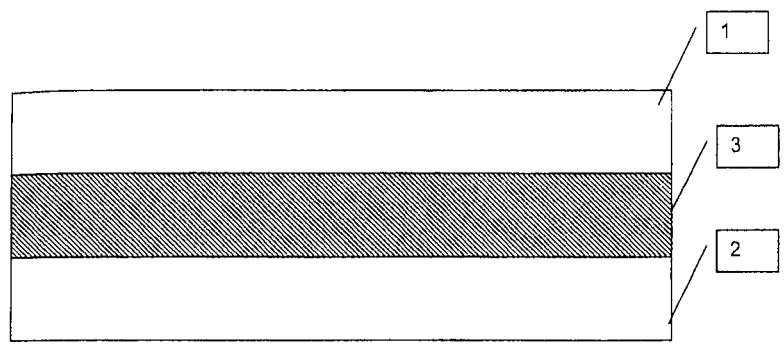
Key:
PMMA (1)
PMMA (2)
TPU (3)

TRANSPARENT PLASTIC COMPOSITE

SUBJECT MATTER OF THE INVENTION

The subject matter of the invention is a plastics composite. The composite is composed by way of example of three layers, where the two external layers are composed of transparent polymethyl methacrylate (PMMA) and the inner layer is composed of a thermoplastic polyurethane (TPU). The plastics composite passes the ECE R43 (Annex 3, 2) falling-ball test and, when compared with standard plastics of identical dimensions, has improved acoustic properties.

PRIOR ART

EP 1 577 084 (KRD Coatings GmbH) describes a plastics composite sheet for vehicle glazing with an internal side and with an external side, where the internal side is composed of polycarbonate (PC) and the external side is composed of poly(meth)acrylate (PMMA). The intermediate layer, intended to absorb the different coefficients of thermal expansion of the plastics PC and PMMA, is composed of a thermoplastic polyurethane (TPU). No data concerning mechanical strength are stated.

WO 02/47908 (VTEC Technologies) describes a glazing element composed of three layers of different plastics, where one layer is composed of PMMA, the intermediate layer is composed of a polyurethane (PU) or of polyvinyl butyral (PVB), and the further layer is composed of PC. The external sides of the glazing element have a scratch-resistant coating. There are no data concerning the mechanical strength or other mechanical properties of the glazing element, other than data on scratch resistance.

WO 96/13137 (Decomax International) describes a glazing element which is intended for vehicles and into which heating elements have been integrated, as in the rear windows of vehicles, for example. There are no data concerning mechanical strength.

OBJECT

In principle, single-layer glazing composed of PC could comply with the mechanical requirements of ECE R43 even without TPU or PMMA layer. However, these sheets have to be provided with a scratch-resistant and UV-resistant layer. The production process here causes very high rejection rates, and this is highly uneconomic. Furthermore, UV-resistant coating and scratch-resistant coating are applied together in one layer to the PC, and this in turn reduces the scratch resistance of the system. A solution described for this comprises systems in which the PC is finished with an outer layer composed of UV-resistant PMMA. A layer composed of TPU or PVB serves here as bonding layer and in essence has the function of generating adhesion between PC and PMMA layer. Furthermore, the TPU layer in these systems has the function of compensating, via its high elasticity, for the different coefficients of linear expansion of the two materials (PC and PMMA). This type of layer also provides an opportunity of integrating heating wires for rear-window heating systems. Straight PMMA sheets do not pass the falling-ball test.

It is an object of the invention to provide a transparent plastics composite which passes the ECE R43 (Annex 3, 2) falling-ball test and, when compared with standard plastics composites of the same dimensions, has improved acoustic properties.

ACHIEVEMENT OF OBJECT

The inventive plastics composite is composed of at least three layers composed of plastics, where the two external layers (1) and (2) are composed of transparent polymethyl methacrylate (PMMA) and the inner layer is composed of a thermoplastic polyurethane (TPU) (3) (see FIG. 1).

Layer thicknesses of (1) and (2) can be in the range from 0.5 to 6 mm, preferably from 1 mm to 3 mm, and those of (3) can be in the range from 0.5 to 5 mm, preferably from 0.5 to 1.5 mm. The layer thicknesses of (1) and (2) may be identical or different. It is preferable that the external side of the plastics composite has been designed to be thicker than the internal side of the plastics composite.

In principle it is also conceivable to produce a non-transparent, coloured variant of the material and to use it as bodywork add-on parts. The two external layers (1) and (2) composed of transparent polymethyl methacrylate (PMMA) can in turn themselves, if appropriate, be composed of a composite composed of at least two layers composed of PMMA.

Furthermore, the layers (1) and (2) can be composed of blends of PMMA and TPU, of PMMA and styrene-acrylonitrile copolymers (SAN), or of blends composed of PMMA and of impact-modified PMMA. Polymethyl methacrylate (PMMA), impact-modified PMMA (imPMMA), blends composed of PMMA or composed of imPMMA and of fluorine polymers, e.g. polyvinylidene fluoride (PVDF), where the mixing ratio between PMMA or imPMMA and PVDF is, for example, from 10:90 to 90:10 parts by weight.

The composite can also, if appropriate, be provided with a scratch-resistant layer and with further functional layers.

The two external layers (1) and (2) composed of transparent polymethyl methacrylate (PMMA) can have been provided with UV absorbers, with UV stabilizers, with IR-reflective pigments and additives or a mixture thereof.

The advantages of the invention are that the PMMA/TPU/PMMA composite system
- meets the mechanical requirements of ECE R43, in particular the falling-ball test, without a polycarbonate layer.
- has better acoustic properties when compared with a single-layer plastics sheet with comparable dimensions.
- unlike PC composite systems, does not have to be equipped with a combined UV- and scratch-resistant layer.
- unlike impact-resistant PMMA variants, does not become turbid even when subjected to a rising or falling temperature.
- when compared with PC, has better modulus of elasticity (better stiffness) and
- unlike PC/TPU/PMMA composites, generates no problems with internal stresses (induced via different coefficients of linear expansion).

Production of Composite:

Variant 1:

The composite sheet was produced via hot pressing of (1) 300×300×2 mm PLEXIGLAS® XT20700 glass-clear, (3) 300×300×1 mm TPU foil (Krystalflex PE 429 or PE 501, Huntsman) and (2) 300×300×2 mm PLEXIGLAS® XT 20700. The press temperature was from 80° C. to 140° C., and the heating time was from 30 to 60 sec, and the pressure was from 10 to 100 kN and was applied for from 20 to 60 sec. PLEXIGLAS®XT grades are marketed by Röhm GmbH.

Variant 2

It is also conceivable that the composite is produced via a 3-component injection-moulding process. A possible method here uses a decorative effect to print on a PLEXIGLAS® foil, which is then reverse-coated with TPU and PMMA by an injection-moulding process.

Variant 3

A further possibility produces the inventive plastics moulding by using PMMA (2) for reverse coating by an injection-moulding process on a laminate composed of a PMMA foil or PMMA sheet (1) and a TPU foil (3).

Materials Used

PMMA

A preferred plastic for the plastics composite encompasses poly(meth)acrylates. These polymers are generally obtained via free-radical polymerization of mixtures which comprise (meth)acrylates. The expression (meth)acrylates encompasses methacrylates and acrylates and mixtures of the two.

These monomers are well known. They include (meth) acrylates derived from saturated alcohols, for example methyl acrylate, ethyl(meth)acrylate, propyl(meth)acrylate, n-butyl(meth)acrylate, tert-butyl (meth)acrylate, pentyl (meth)acrylate and 2-ethylhexyl(meth)acrylate; (meth)acrylates derived from unsaturated alcohols, for example oleyl (meth)acrylate, 2-propynyl(meth)acrylate, allyl(meth) acrylate, vinyl(meth)acrylate; aryl(meth)acrylates, such as benzyl (meth)acrylate or phenyl(meth)acrylate, where in each case the aryl radicals may be unsubstituted or have up to four substituents; cycloalkyl(meth)acrylates, such as 3-vinylcyclohexyl(meth)acrylate, bornyl(meth)acrylate; hydroxyalkyl(meth)acrylates, such as 3-hydroxypropyl(meth)acrylate, 3,4-dihydroxybutyl (meth)acrylate, 2-hydroxyethyl (meth)acrylate, 2-hydroxypropyl(meth)acrylate; glycol di(meth)-acrylates, such as 1,4-butanediol(meth)acrylate, (meth)acrylates of ether alcohols, for example tetra-hydrofurfuryl(meth)acrylate, vinyloxyethoxyethyl (meth)acrylate; amides and nitriles of (meth)acrylic acid, for example N-(3-dimethylaminopropyl)-(meth)acrylamide, N-(diethylphosphono)(meth)acrylamide, 1-methacryloylamido-2-methyl-2-propanol; sulphur-containing methacrylates, such as ethylsulphinylethyl (meth)acrylate, 4-thiocyanatobutyl (meth)acrylate, ethylsulphonylethyl(meth)acrylate, thiocyanatomethyl (meth)acrylate, methylsulphinylmethyl(meth) acrylate, bis((meth)acryloyloxyethyl) sulphide; polyfunctional (meth)acrylates, such as trimethyloylpropane tri(meth)acrylate.

According to a preferred aspect of the present invention, these mixtures comprise at least 40% by weight, preferably at least 60% by weight, and particularly preferably at least 80% by weight of methyl methacrylate, based on the weight of the monomers.

Besides the abovementioned (meth)acrylates, the compositions to be polymerized may also comprise other unsaturated monomers copolymerizable with methyl methacrylate and the abovementioned (meth)acrylates.

They include 1-alkenes, such as 1-hexene, 1-heptene; branched alkenes, such as vinylcyclohexane, 3,3-di-methyl-1-propene, 3-methyl-1-diisobutylene, 4-methyl-1-pentene; acrylonitrile; vinyl esters, such as vinyl acetate; styrene, substituted styrenes having an alkyl substituent in the side chain, e.g. α-methylstyrene and α-ethylstyrene, substituted styrenes having an alkyl substituent on the ring, such as vinyltoluene and p-methylstyrene, halogenated styrenes, such as monochlorostyrenes, dichlorostyrenes, tribromostyrenes and tetrabromostyrenes; heterocyclic vinyl compounds, such as 2-vinylpyridine, 3-vinylpyridine, 2-methyl-5-vinyl-pyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinyl-pyrrolidone, 2-vinylpyrrolidone, N-vinylpyrrolidine, 3-vinylpyrrolidine, N-vinylcaprolactam, N-vinylbutyro-lactam, vinyloxolane, vinylfuran, vinylthiophene, vinylthiolane, vinylthiazoles and hydrogenated vinylthiazoles, vinyloxazoles and hydrogenated vinyloxazoles; vinyl and isoprenyl ethers; maleic acid derivatives, such as maleic anhydride, methylmaleic anhydride, maleimide, methylmaleimide; and dienes, such as divinylbenzene.

The amount generally used of these comonomers is from 0 to 60% by weight, preferably from 0 to 40% by weight, and particularly preferably from 0 to 20% by weight, based on the weight of the monomers, and these compounds may be used individually or in the form of a mixture.

The polymerization is generally initiated using known free-radical initiators. Among the preferred initiators are, inter alia, the azo initiators well-known to the person skilled in the art, for example AIBN and 1,1-azobiscyclohexanecarbonitrile, and also peroxy compounds, such as methyl ethyl ketone peroxide, acetylacetone peroxide, dilauroyl peroxide, tert-butyl 2-ethylperhexanoate, ketone peroxide, methyl isobutyl ketone peroxide, cyclohexanone peroxide, dibenzoyl peroxide, tert-butyl peroxybenzoate, tert-butylperoxyisopropyl carbonate, 2,5-bis(2-ethylhexanoylperoxy)-2,5-dimethylhexane, tert-butyl 2-ethylperoxyhexanoate, tert-butyl 3,5,5-trimethylperoxyhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, and UV initiators such as 1,2-diphenyl-2,2-dimethoxyethanone, mixtures of two or more of the abovementioned compounds with one another, and also mixtures of the abovementioned compounds with compounds not mentioned but likewise capable of forming free radicals.

The amount often used of these compounds is from 0.01 to 10% by weight, preferably from 0.5 to 3% by weight, based on the weight of the monomers.

The abovementioned polymers can be used individually or as a mixture.

The inventive plastics sheets can by way of example be produced from moulding compositions of the abovementioned polymers. Thermoplastic shaping processes, such as extrusion or injection moulding, are usually used here.

The weight-average molar mass $M_W$ of the homo- and/or copolymers to be used according to the invention as moulding compositions for producing the plastics sheets may vary within a wide range, the molar mass usually being matched to the intended use and to the mode of processing of the moulding composition. However, it is generally in the range from 20 000 to 1 000 000 g/mol, preferably from 50 000 to 500 000 g/mol and particularly preferably from 80 000 to 300 000 g/mol, with no intended resultant restriction.

Particularly preferred moulding compositions which encompass poly(meth)acrylates are available commercially from Röhm GmbH with the trademark PLEXIGLAS® XT.

The plastics sheets particularly preferable encompass at least 80% by weight, in particular at least 90% by weight, of poly(meth)acrylates, based on the total weight of the sheet. It is particularly preferable that the plastics sheets are composed of polymethyl methacrylate, and this polymethyl methacrylate can comprise conventional additives. These plastics sheets composed of polymethyl methacrylate are commercially available inter alia from Röhm GmbH with the trademark PLEXIGLAS® XT.

The plastics sheets can moreover be produced via cell casting processes. Here, by way of example, suitable acrylic resin mixtures are placed in a mould and polymerized. Sheets thus produced are commercially available from Röhm GmbH with the trademark PLEXIGLAS® GS.

Additives

The moulding compositions to be used for production of the plastics sheets can moreover, as also can the acrylic resins, comprise conventional additives of any type. Among these are inter alia antistatic agents, antioxidants, mould-release agents, flame retardants, lubricants, dyes, flow improvers, fillers, light stabilizers and organophosphorus compounds, such as phosphites or phosphonates, pigments, weathering stabilizers and plasticizers. However, the amount of additives is subject to restriction relevant to the intended use.

These sheets can be transparent or coloured sheets. Colouring of the sheets can by way of example be achieved via dyes or pigments. Accordingly, any desired plastics sheets can be combined with one another according to the process of the present invention. By way of example, it is possible to combine PLEXIGLAS® XT sheets with PLEXIGLAS® GS sheets and/or PLEXIGLAS® GS sheets with PLEXIGLAS® SZ sheets and/or PLEXIGLAS® LSW sheets with PLEXIGLAS® XT sheets, and it is possible here to combine a colourless sheet with a coloured sheet or to combine two colourless sheets or to combine two coloured sheets with one another.

Fluorine Polymers

For the purposes of the present invention, fluorine polymers are polymers which can be obtained via free-radical polymerization of olefinically unsaturated monomers which have at least one fluorine substituent at their double bond. Copolymers are also included here. These copolymers can contain, alongside one or more fluorine-containing monomers, further monomers which are copolymerizable with these fluorine-containing monomers.

Among the fluorine-containing monomers are inter alia chlorotrifluoroethylene, fluorovinylsulphonic acid, hexafluoroisobutylene, hexafluoropropylene, perfluorinated vinyl methyl ether, tetrafluoroethylene, vinyl fluoride and vinylidene fluoride. Among these, particular preference is given to vinylidene fluoride.

Thermoplastic Polyurethane

The thermoplastic polyurethane used comprises a product having aliphatic or aromatic units within the compound.

Polyurethanes (PUs) are polymers whose macromolecules have linkage of the repeat units via urethane groups —NH—CO—O—. Polyurethanes are generally obtained via polyaddition from di- or polyhydric alcohols and isocyanates according to

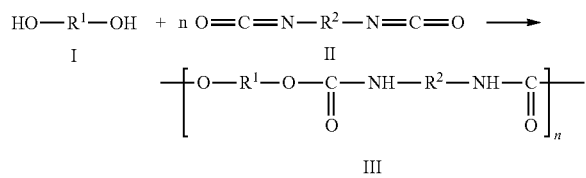

R1 and R2 here can be low-molecular-weight or even polymeric aliphatic or aromatic groups. Industrially important PUs are produced from polyesterdiols and/or polyetherdiols and, for example, tolylene 2,4- or 2,6-diisocyanate (TDI, $R^2=C_6H_3—CH_3$), 4,4'-methylenedi-(phenylisocyanate) (MDI, $R^2=C_6H_4—CH_2—C_6H_4$), 4,4'-methylenedicyclohexyl isocyanate (HMDI, $R^2=C_6H_{10}—CH_2—C_6H_{10}$) or hexamethylene diisocyanate [HDI, $R^2=(CH_2)_6$].

The PUs can generally be synthesized without solvent or in inert organic solvents. Certain amines or organotin compounds are widely used as catalysts for the polyaddition reaction. Use of equimolar ratios of difunctional alcohols and isocyanates leads to linear PUs. If starting materials of higher functionality are used or else if there is an excess of isocyanate, branched and crosslinked products are produced, where isocyanate groups react with the urethane groups or urea groups to form allophanate structures or, respectively, biuret structures, e.g.:

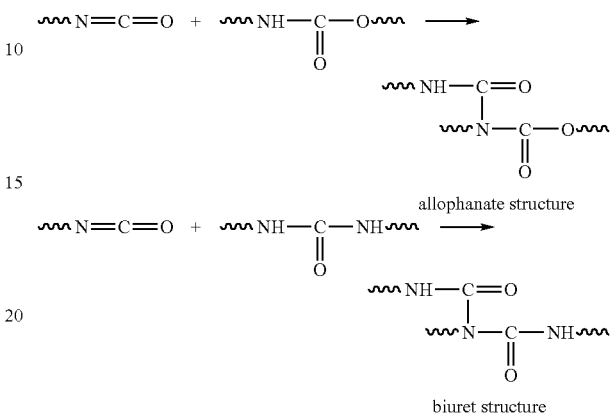

As a function of the selection and stoichiometric ratio of the starting materials, PUs with very different mechanical properties are produced, these being used as constituents of adhesives and of coatings (polyurethane resins), as ionomers, as thermoplastic material for bearing parts, rollers, tyres, and rolls, and as elastomers of varying hardness in fibre form (elastic fibres, PUE being the abbreviation for these elastane or spandex fibres) or as polyether- or polyester-urethane rubber (the abbreviation to DIN ISO 1629: 1981-10 being EU and, respectively, AU), as thermoset casting resins (including those which are glass-fibre-reinforced), etc., and also as foam plastics; see also polyurethane rubbers, polyurethane coatings, polyurethane resins. PUs have moreover been described inter alia in Kunststoffe 85, 1616 (1995), Batzer 3, 158-170 Batzer 3, 158-170; Domininghaus (5.), pp. 1140 et seq.; Encycl. Polym. Sci. Eng. 13, 243-303; Houben-Weyl E 20/2, 1561-1721.

Infrared-Reflective Pigments

By using various infrared-reflective, inorganic colour pigments in PMMA moulding compositions it is possible to use these moulding compositions to produce dark-coloured plastics mouldings and to coat other plastics mouldings with the abovementioned PMMA moulding compositions, these having a markedly lower rate of heating on insolation than mouldings which are composed of conventionally dark-coloured PMMA or have been coated therewith.

The following pigments can be used, for example:

| CAS number | C.I. name | C.I. number | Chemical name |
|---|---|---|---|
| 68186-85-6 | C.I. Pigment Green 50 | C.I. 77377 | Cobalt titanite green spinel |
| 1308-38-9 | C.I. Pigment Green 17 | C.I. 77288 | Chromium oxide |
| 109414-04-2 | C.I. Pigment Brown 29 | | Chromium iron oxide |
| 68187-09-7 | C.I. Pigment Brown 35 | C.I. 77501 | Iron chromite brown spinel |
| 71631-15-7 | C.I. Pigment Black 30 | C.I. 77504 | Nickel iron chromite black spinel |

C.I. nomenclature from Colour Index, The Society of Dyers and Colourists (SDC)

Studies on Specimens

Samples produced from Variant 1 successfully passed the ECE R43 (Annex 3, paragraph 2.1 and Annex 14, paragraph 5) falling-ball test.

The drop height of the ball was 4.37 m, the weight of the ball was 225 g and its diameter was 38 mm. In each case, 5 specimens were tested at 23 degrees Celsius and five specimens were tested at −18 degrees Celsius.

Results: In none of the tested samples did the ball penetrate the material, and no splintering of fragments occurred. The test was passed.

In comparison with the measurements at higher temperature, an exploratory experiment at minus 40 degrees specimen temperature gave markedly shorter cracks in the test specimen.

The invention claimed is:

1. A plastic composite, comprising:
    a first poly(meth)acrylate layer;
    a second poly(meth)acrylate layer; and
    a layer comprising a thermoplastic polyurethane provided between the first poly(meth)acrylate layer and the second poly(meth)acrylate layer;
    wherein:
    the first poly(meth)acrylate layer is free of polyurethane elastomers;
    the second poly(meth)acrylate layer is free of polyurethane elastomers;
    a thickness of the first poly(meth)acrylate layer is from 0.5 to 6 mm;
    a thickness of the second poly(meth)acrylate layer is from 0.5 to 6 mm; and
    a thickness of the layer comprising the thermoplastic polyurethane is from 0.5 to 5 mm.

2. The plastic composite according to claim 1, wherein a scratch-resistant layer is provided on at least one of a surface of the first poly(meth)acrylate layer opposite from the layer comprising the thermoplastic polyurethane and a surface of the second poly(meth)acrylate layer opposite from the layer comprising the thermoplastic polyurethane.

3. The plastic composite according to claim 1, wherein at least one of the first poly(meth)acrylate layer and the second poly(meth)acrylate layer is colored.

4. The plastic composite according to claim 1, wherein at least one of the first poly(meth)acrylate layer and the second poly(meth)acrylate layer comprises an IR-reflective pigment.

5. The plastic composite according to claim 1, wherein at least one of the first poly(meth)acrylate layer and the second poly(meth)acrylate layer comprises a UV absorber.

6. The plastic composite according to claim 1, wherein at least one of the first poly(meth)acrylate(meth)acrylate layer and the second poly(meth)acrylate layer comprises an impact modifier.

7. The plastic composite according to claim 1, wherein a thickness of the first poly(meth)acrylate layer and a thickness of the second poly(meth)acrylate layer are the same.

8. A glazing comprising the plastic composite according to claim 1.

9. A component for a noise barrier comprising the plastic composite according to claim 1.

10. The component according to claim 9, wherein a thickness of the first poly(meth)acrylate layer and a thickness of the second poly(meth)acrylate layer are the same.

11. A bodywork construction comprising the plastic composite according to claim 1.

12. A bodywork component, equipped with the plastic composite according to claim 1.

13. A process for production of the plastic composite according to claim 1, comprising:
    heating plastic sheets to a temperature of from 80° C. to 140° C.; and
    pressing the plastic sheets together for from 20 to 60 seconds with a force of from 10 to 100 kN.

14. The process according to claim 13, wherein:
    a thickness of the first poly(meth)acrylate layer is from 1 to 3 mm;
    a thickness of the second poly(meth)acrylate layer is from 1 to 3 mm; and
    a thickness of the layer comprising the thermoplastic polyurethane is from 0.5 to 1.5 mm.

15. The process according to claim 13, wherein a thickness of the first poly(meth)acrylate layer and a thickness of the second poly(meth)acrylate layer are the same.

* * * * *